(12) United States Patent
Schell

(10) Patent No.: US 8,177,639 B2
(45) Date of Patent: May 15, 2012

(54) CONTROLLING AN INTERACTIVE STORY THROUGH MANIPULATION OF SIMULATED CHARACTER MENTAL STATE

(76) Inventor: Jesse Schell, Pittsburgh, PA (US)

( * ) Notice: Subject to any disclaimer, the term of this patent is extended or adjusted under 35 U.S.C. 154(b) by 679 days.

(21) Appl. No.: 12/293,669

(22) PCT Filed: Mar. 19, 2007

(86) PCT No.: PCT/US2007/006825
§ 371 (c)(1), (2), (4) Date: Sep. 19, 2008

(87) PCT Pub. No.: WO2007/109237
PCT Pub. Date: Sep. 27, 2007

(65) Prior Publication Data
US 2010/0167819 A1    Jul. 1, 2010

Related U.S. Application Data

(60) Provisional application No. 60/783,896, filed on Mar. 20, 2006.

(51) Int. Cl.
*A63F 9/24* (2006.01)
(52) U.S. Cl. ........................................................ 463/36
(58) Field of Classification Search .................. 463/36
See application file for complete search history.

(56) References Cited

U.S. PATENT DOCUMENTS

| 2004/0103148 A1 | 5/2004 | Aldrich |
| 2005/0223328 A1 | 10/2005 | Ashtekar et al. |
| 2007/0196797 A1* | 8/2007 | Mitsuyoshi ................ 434/236 |

OTHER PUBLICATIONS

International Search Report for International Application PCT/US 2007/06825 dated Jan. 30, 2008.
Written Opinion of the International Searching Authority for International Application No. PCT/US 2007/06825 dated Jan. 30, 2008.
International Preliminary Report on Patentability for International Application No. PCT/US 2007/06825 dated Sep. 23, 2008.

* cited by examiner

*Primary Examiner* — Pierre E Elisca
(74) *Attorney, Agent, or Firm* — K&L Gates LLP

(57) ABSTRACT

In various embodiments, methods and systems are provided for simulating the effect of mental state on character behavior in an interactive story environment. One method embodiment includes facilitating manipulation of a simulated mental state model of a character in the interactive story, wherein the mental state model comprises at least one pre-behavior representation associated with at least one character behavior which may be a thought, verbal expression, or action, for example; and, applying the manipulated mental state model to generate at least one behavior of the character in the interactive story.

17 Claims, 17 Drawing Sheets

Story Progression Guide

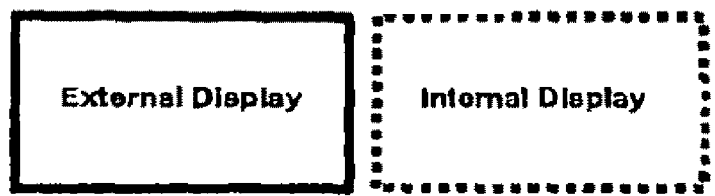
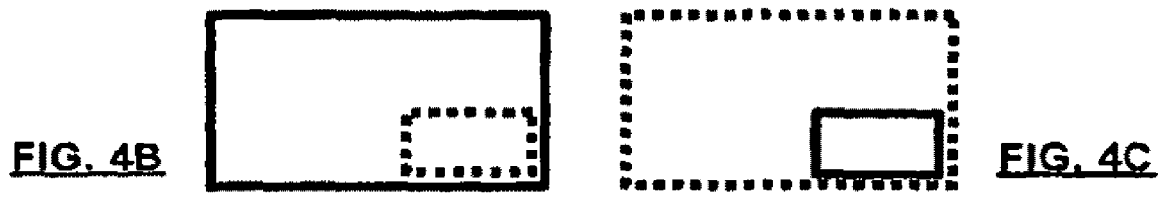
FIG. 4B          FIG. 4C
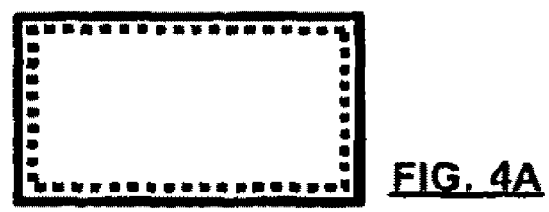
FIG. 4A
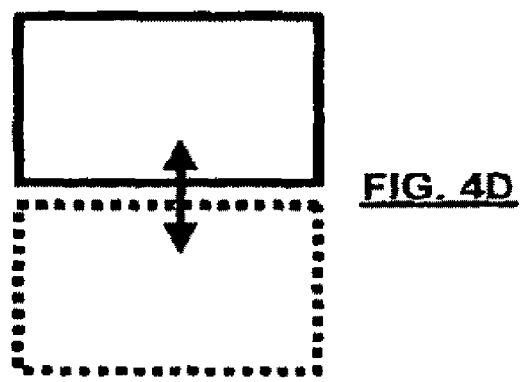
FIG. 4D
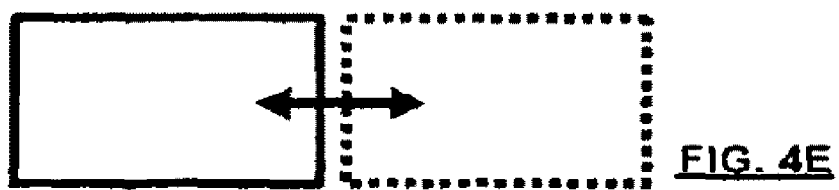
FIG. 4E
A: Internal Display inside External Display
B: External Display inside Internal Display
C: External & Internal Displays alternating in same space
D: Stacked Displays
E: Side by Side Displays

Example of Internal Mental State Data

| Attribute | Value |
|---|---|
| Joy | 10 |
| Anger | 0 |
| Fear | 0 |
| Sadness | 0 |
| Possible Character Behaviors | PLANE-THOUGHT, CLOCK-THOUGHT |

FIG. 6

Example of External State Data

| Attribute | Value |
|---|---|
| Time | 7:15am |
| Tension | 15 |
| Present Subjects | None |

FIG. 7

Story Manager Detail

| Step | Takes as Input | Process | Outputs |
|---|---|---|---|
| 252 | 1. Initial State Data<br>2. Story Guide | 1. Fills in the opening scene of the story by applying state data to the Story Guide<br>2. Updates state data appropriately based on the opening scene | 1. Scene expressing the initial game situation |
| 254 | 1. Current State Data | 1. Prepares information needed by the mental model including pre-behavior representations, emotion levels, subject list, character act list, situation tension, and/or others | 1. Information to the Mental State Model |
| 260 | 1. Triggered character behavior | — | 1. Scene depicting the character behavior |
| 260, 262 | 1. Triggered character behavior<br>2. Story Guide<br>3. Current State Data | 1. Applies the Story Guide to the character behavior and current data to determine the external result of the behavior<br>2. Determines state changes based the Story Guide | 1. One or more scenes of External Display content,<br>2. State changes |

FIG. 8

Sample Script for Story Guide

Initial Scene: (Bob brushing his teeth)

Initial Emotions: Joy+10

Initial Character Behaviors:

PLANE-THOUGHT (subject: plane, type: thought, emotion: joy, delay: 0)

CLOCK-THOUGHT (subject: clock, type: thought, emotion: neutral, delay: 0)

PLANE-THOUGHT:
Scene: ("I can't wait to try that new FX-18" ,Visual of RC plane)
State Changes: joy+3
Act Changes: opens PLANE-DAYDREAM (s: plane, t: thought, e: joy)
> PLANE-DAYDREAM:
    Scene: (Visual of majestic, soaring plane – smiling Bob at the controls)
    State Changes: joy+3, time+5mins
    Opens: PLANE-SATISFIED (s: plane, t: thought, e: joy)
    ✧ PLANE-SATISFIED:
       Scene: ("Yeah, that'll be sweet.")
       State Changes: time+5mins
       Opens: HOBBY-SHOP-THOUGHT (s: Hobby Shop, t:thought, e:neutral)
    ✧ HOBBY-SHOP-THOUGHT:
       Scene: ("I should stop by there tonight, to see if it is in yet.")
       State Changes: time+5mins
       Opens: MONEY-THOUGHT (s: Money, t:thought, e:sad)
           PLANE-PSYCHED (s:Plane, t: thought, e:joy)
        • MONEY-THOUGHT:
          Scene: ("It'll be expensive, though. I should probably save my money.")
          State Changes: Joy-5, time+5mins
        • PLANE-PSYCHED:
          Scene: ("It's gonna be so great!")
          State Changes: Joy+3, time+5mins
• CLOCK-THOUGHT:
   Scene: ("What time is it?")
   Condition: Time < 7:25
        Scene: ("I still have some time")
      Else
        Scene: ("Oh no! I'll be late!")
        State Changes: Fear+10
        Opens: BUS-RUN (s:Bus, t:action, e:fear, d:3)
              WALLET-THOUGHT (s:Wallet, t:thought, e:neutral)
              BOSS-THOUGHT(s:Boss, t:thought, e:fear),
        Closes: all other thoughts ⎯ 902
> WALLET-THOUGHT:
    Scene: ("Where is my wallet?")
    Opens: WALLET-SEARCH-1 (s:Wallet,t:action,e:fear)
    ✧ WALLET-SEARCH-1:
       Scene: ( <looks under bed> "I don't have time for this!")
       State Changes: Fear+3, Tension+6
       Opens: WALLET-SEARCH-2 (s:Wallet,t:action,e:fear)
        • WALLET-SEARCH-2:
          Scene: (<looks on kitchen table> "Here it is!")
          State Changes: Fear-3
> BOSS-THOUGHT:
    Scene: ("The boss will kill me if I'm late again!")
    State Changes: Fear+4
    Opens: BOSS-DAYDREAM (s:Boss,t:thought,e:fear)

FIG. 9A

❖ BOSS-DAYDREAM:
  Scene: (flashback of boss lecturing Bob: "If you come in late again, you're fired!") State
  Changes: Fear+2, Tension+1
  Opens: BOSS-ANGRY (s:Boss,t:thought,e:anger)
      BOB-SAD (s:Bob,t:thought,e:sad)
  ● BOSS-ANGRY:
      Scene: ("One day I'm going to tell him what I really think!")
      State Changes: Anger+2
  ● BOB-SAD:
      Scene: (<ashamed> "Why can't I just get up on time?")
      State Changes: Sadness+2

➤ BUS-RUN:
  Scene: (<Bob runs out the door>)
  Closes: all WALLET thoughts
  Opens: BUS-THOUGHT-1 (s:Bus,t:thought,e:fear)
      EXHAUSTION-THOUGHT-1 (s:Exhaustion, t:thought, e:neutral, d:1)
  Triggers: BUS-SIGHTING-REACTION (d:3)        —904

❖ BUS-THOUGHT-1:
      Scene: ("Please, bus – please be late!")
      Opens: BUS-THOUGHT-2 (s:Bus,t:thought,e:fear)
      ● BUS-THOUGHT-2:
          Scene: ("Come on, come on, come on!")
  ❖ EXHAUSTION-THOUGHT-1:
      Scene: ("Why can't the bus stop be downhill?")
      Opens: EXHAUSTION-THOUGHT-2 (s:Exhaustion, t:thought, e:sad)
      ● EXHAUSTION-THOUGHT-2:
          Scene: ("I am totally out of shape.")
          State Changes: Sadness+2
          Opens: EXHAUSTION-THOUGHT-3 (s:Exhaustion, t:thought, e:neutral)
          ➤ EXHAUSTION-THOUGHT-3:
              Scene: ("I promise I will start working out.")
  ❖ BUS-SIGHTING-REACTION:
      Scene: ("The bus just pulled up! I'm going to make it!")
      State Changes: Joy+10
      Closes: BUS-RUN and all children
      Opens: BUS-THOUGHT-3 (s:Bus, t:thought, e:joy)
      Triggers: SALLY-CRASH-REACTION (d:1)
      ● BUS-THOUGHT-3
          Scene: ("YAHOO! I made it!")
      ● SALLY-CRASH-REACTION:
          Scene: (Bob crashes into Sally – bus pulls away.)
          State Changes: Fear+5, Sadness+3, Anger+5, Tension+1
          Closes: all other thoughts
          Opens: BUS-DESPERATION (s:Bus, t:thought, e:sad)
              MYST-ANGER-THOUGHT (s:Mystery Person, t:thought, e:anger)
              MYST-CONCERN-THOUGHT (s:Mystery Person, t:thought, e:fear)
              BOSS-CONCERN (s:Boss, t:thought, e:fear)
              GLASSES-THOUGHT (s:Glasses, t:thought, e:fear, d:2)
          ➤ MYST-ANGER-THOUGHT:
              Scene: ("Who is this idiot?")
              State Changes: Anger+2
              Opens: MYST-ANGER-SHOUT (s:Mystery Person, t:action, e:anger)
              ❖ MYST-ANGER-SHOUT:
                  Scene: ("Why can't you watch where you're going!")
                  State Changes: Anger+1
          ➤ BUS-DESPERATION
              Scene: ("No! No! No!" ( bus driving away))
              State Changes: Sadness+2
              Opens: BUS-SHOUT (s:Bus, t:action, e:neutral)

FIG. 9B

- ❖ BUS-SHOUT
    Scene: ("Hold that bus!" (Bus drives away))
    State Changes: Sadness+2
- ➢ MYST-CONCERN-THOUGHT:
    Scene: ("Yikes – did I hurt someone?")
    State Changes: Fear+1
    Opens: MYST-CONCERN-QUESTION (s:MysteryPerson, t:action, e:fear)
    - ❖ MYST-CONCERN-QUESTION:
        Scene: ("I'm so sorry! Are you okay?")
- ➢ BOSS-CONCERN:
    Scene: ("Oh my God – the boss is gonna kill me!")
    State Changes: Fear+3, Sadness+1
    Opens: BOSS-CONCERN-2 (s:Boss, t:thought, e:fear)
    - ❖ BOSS-CONCERN-2
        Scene: ("What am I going to do?")
        State Changes: Fear+1, Sadness+1
        Opens: BOSS-STORY (s:Boss, t:thought, e:fear)
            BOSS-DESPAIR (s:Boss, t:thought, e:fear)
        - • BOSS-STORY
            Scene: ("I'll have to make up some kind of story...")
            State Changes: Fear+1
        - • BOSS-DESPAIR
            Scene: ( "God, I'm a loser.")
            State Changes: Sadness+2
- ➢ GLASSES-THOUGHT (s:Glasses, t:thought, e:fear)
    - ❖ GLASSES-THOUGHT
        Scene: ("My glasses! I lost my glasses!")
        State Changes: Fear+2
        Opens: GLASSES-GROPE (s:Glasses, t:action, e:fear)
        - • GLASSES-GROPE:
            Scene: (Bob gropes for, finds his glasses – putting them on, he sees a woman sitting on the sidewalk, crying into her hands. )
            State Changes: Anger-3, Sadness-2
            Closes: MYST-ANGER-THOUGHT
                BUS-DESPERATION
                MYST-CONCERN-THOUGHT
                BOSS-CONCERN (and all their children)
            Opens: CRYING-GIRL-QUESTION
                BRIEFCASE-THOUGHT

Example - Evaluation Processor

Using Data Table

| Trigger | Condition | Side effect | Scene | Ensue | Delete | Require |
|---|---|---|---|---|---|---|
| CLOCK-THOUGHT | Time=7:26 | | Scene1 | | | |
| CLOCK-THOUGHT | | From 10 | Scene2 | BUS-RUN (a:Bus, b:action, e:fear, d:3), WALLET-THOUGHT (a:wallet, t:thought, e:neutral), BOSS-THOUGHT (a:Boss, t:thought, e:fear) | | |
| BUS-RUN | | | Scene10 | BUS-THOUGHT-1 (a:Bus,t:thought, e:fear), EXHAUSTION-THOUGHT-1 (x:Exhaustion, t:thought, e:neutral, d:1) | | BUS-SIGHTING-REACTION (d:3) |

FIG. 11

| System Sequence Step | Display Content | Description |
|---|---|---|
| 1 | 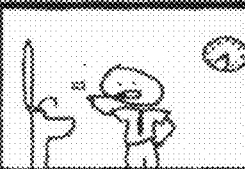 | This is the opening scene. The character, Bob, is getting ready for work. This visual is on the External Display. |
| 2 | 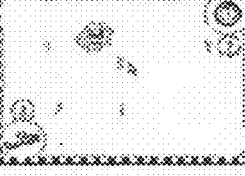 | This is the visual from the Internal Display showing the Mental State Model representing Bob's current Mental State. Bob currently has +10 Joy (represented by the yellow emotional pool) and two potential Character Behaviors (represented by the thought bubbles attached to the plane and clock subjects.) |
| 3 | | In this step, the user is controlling the Mental Energy figures in the Mental State Model to feed their desired Character Behavior. |
| 4 | 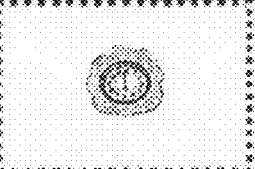 | The user has triggered the Clock Thought Character Pre-Behavior Representation. |
| 5 | 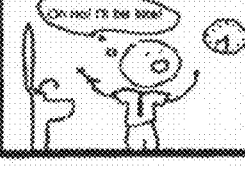 | Focus shifts to the External Display and the triggered Character Behavior is displayed to the User. |
| 6 | | Repercussions of the Character Behavior on the story take effect in this step. In this case there are no more external scenes as a result of this Character Behavior. However, the Behavior does cause a change in the Internal Mental State of Bob. This change adds +10 Fear to Bob's emotions, closes the Plane Thought Character Behavior and opens the Boss Thought, Bus Action, and Wallet Thought Character Behaviors. |
| 7 | 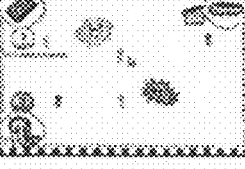 | The Mental State Model shown on the Internal Display has now changed to reflect the new game state. The purple emotion pool reflects the increase in Bob's Fear. The new Wallet Thought Character Behavior is neutral (gray) while the Bus and Boss Character Behaviors are associated with Fear. |

FIG. 12

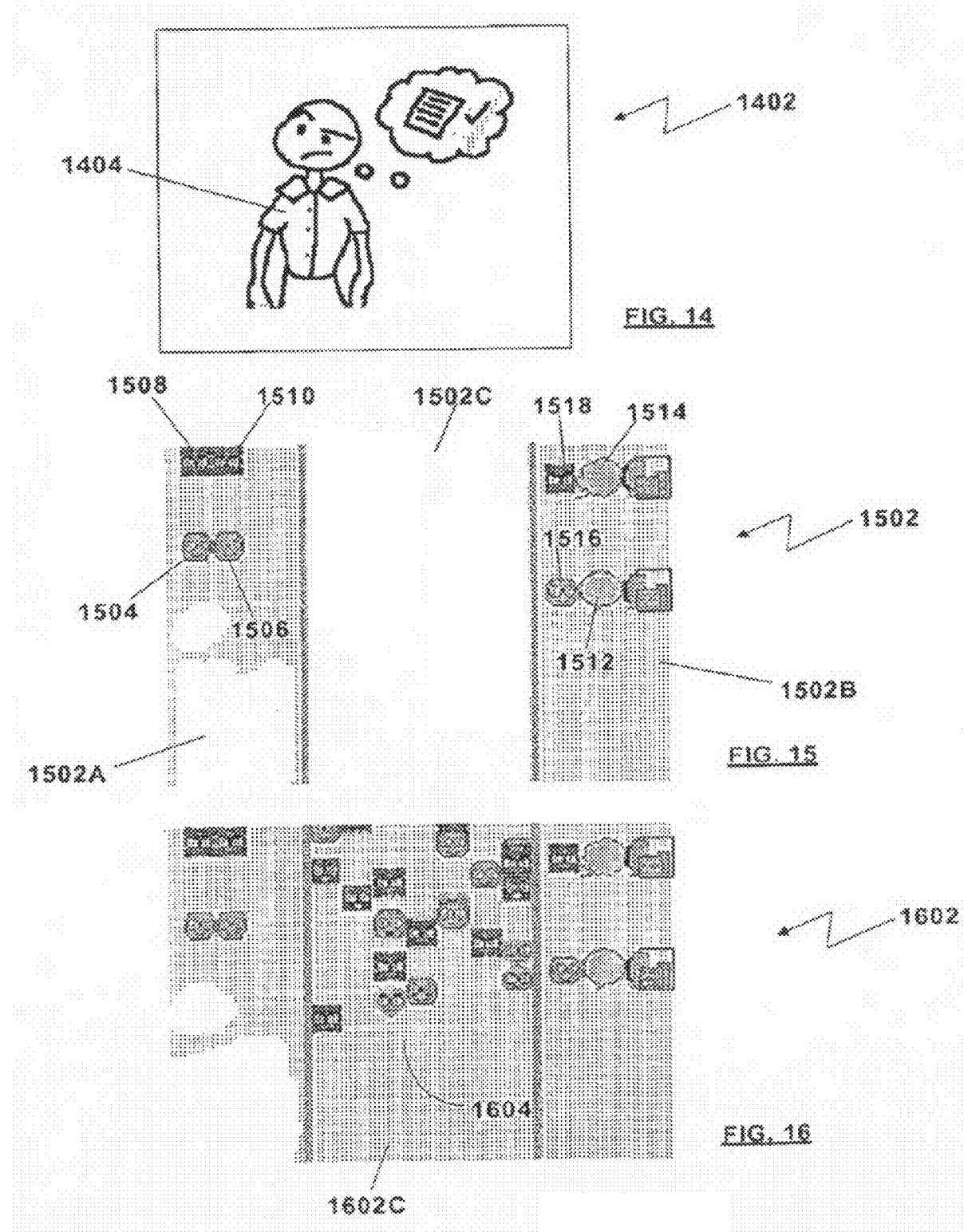

CONTROLLING AN INTERACTIVE STORY THROUGH MANIPULATION OF SIMULATED CHARACTER MENTAL STATE

CROSS-REFERENCE TO RELATED APPLICATIONS/PRIORITY CLAIM

The present application is a U.S. national stage application of PCT International Application No. PCT/US2007/06825, filed Mar. 19, 2007 and published as PCT Publication WO 2007/109237 on Sep. 27, 2007, which claims priority to U.S. Provisional Patent Application Ser. No. 60/783,896, filed on Mar. 20, 2006, the disclosures all of which are hereby incorporated in their entirety by reference.

FIELD OF THE INVENTION

The invention generally relates to processes and systems for simulating and manipulating the mental state of a character in association with controlling or directing an interactive story.

BACKGROUND

Many conventional interactive stories, such as those which can be played on computers, video game devices, or other interactive media, have significant weaknesses and disadvantages. Despite the efforts of interactive stories to make participants feel more engaged than they would be in more traditional media, such as by viewing print or film media, the story experience is often a disappointment. After interacting with a typical interactive story, many participants feel comparatively less engaged and less emotionally involved than they might have felt by merely reading or viewing the story through a traditional medium.

There is a need in the art for interactive stories that are more emotionally engaging and which can offer a new dimension to interacting with a character in a story. Despite the evolution of computer graphics technology in video games over the course of time, storytelling techniques employed in interactive story games have remained fundamentally unchanged. Conventional interactive stories still maintain an inherent focus on controlling the actions of characters, and do not sufficiently factor thoughts, emotions, or other aspects of character mental states into telling the story. The capacity for a player to manipulate character mental states is disregarded or completely ignored in many existing interactive stories.

In interactive stories presented in video games and other electronic media, player interaction and game play typically occur in the "external world" of the story. If the characters have any mental life or psychological existence in the story, the player is not usually given knowledge of what it is. But even when minimal information about the character mental state is communicated to the player, the "inner life" of the character typically remains completely non-interactive with the story; the player can only interact with the "outer life" or physical actions of the character.

As long as the need for enhanced mental and emotional engagement in interactive stories remains unsatisfied, there can be no progress towards the goal of providing participants with a more meaningful and enriching experience in association with controlling or directing an interactive story.

BRIEF DESCRIPTION OF THE FIGURES

The utility of the embodiments of the invention will be readily appreciated and understood from consideration of the following description when viewed in connection with the accompanying drawings, wherein:

FIGS. 4A-4E include various examples of screen display configurations that may be provided in accordance with embodiments of the invention;

FIG. 6 includes a table of sample internal mental state module data;

FIG. 7 includes a table of sample external state module data;

FIG. 8 includes a table of illustrating aspects of operation of a story manager module configured in accordance with various embodiments of the invention;

FIGS. 9A-9C include an example of a script that may be used by a story guide in accordance with embodiments of the invention;

FIG. 11 includes a table illustrating operational aspects of an evaluation processor structured in accordance with embodiments of the invention;

FIG. 12 includes a table illustrating a process flow of an exemplary sequence of steps that can be performed in accordance with various embodiments of the invention;

FIG. 14 illustrates a sample visual depiction that may be displayed to a user on an external display in association with various embodiments of the invention;

FIGS. 15 through 20 illustrate examples of screen displays or user interfaces that may be configured to facilitate manipulation of a mental state model in association with various embodiments of the invention;

DESCRIPTION

In various embodiments, the invention permits a user to control or direct an interactive story by manipulating an interactive simulation of the mental state of one or more characters involved in the story. Instead of interacting directly with the external environment in a story to control behavior of the character, embodiments of the invention permit interactivity or user manipulation to be performed in a simulation or model of the character's mental state. At various stages of the story, the simulated mental state drives generation of a character action or other behavior, which plays out in the story for the user to see. The results of the character behavior can alter the simulated mental state, and the user can continue to manipulate the simulated mental state as the interactive story progresses.

Figure 1:
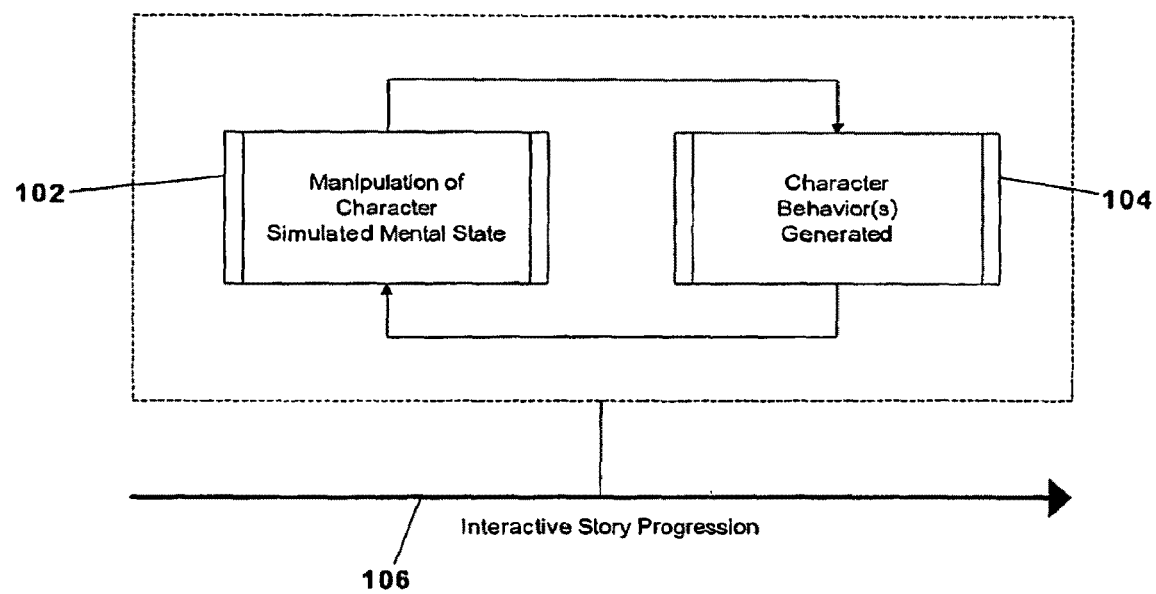
FIG. 1 includes a schematic overview of the operation and function of various embodiments of the invention.

By way of an overview, as shown in FIG. 1, various embodiments of the invention permit manipulation of a simulated mental state of a character in an interactive story at step 102. At least in part based on the manipulated mental state, one or more character behaviors can be generated at step 104. The general process schematically depicted in FIG. 1 may occur repeatedly in various manifestations as the interactive story progresses, as represented by story line arrow 106. It can be seen that the invention offers embodiments of systems and methods for simulating the effect of mental state on character behavior in an interactive story environment. These embodiments may include facilitating manipulation of a simulated mental state of a character in the interactive story by permitting a user to interact with or alter the mental state model. The mental state model may include at least one pre-behavior representation associated with at least one behavior including, for example and without limitation, a thought, a verbal expression, an action, and/or other behaviors. Various method and system embodiments also include applying the manipulated mental state model to generate at least one of the character behaviors in the interactive story.

Figure 2:
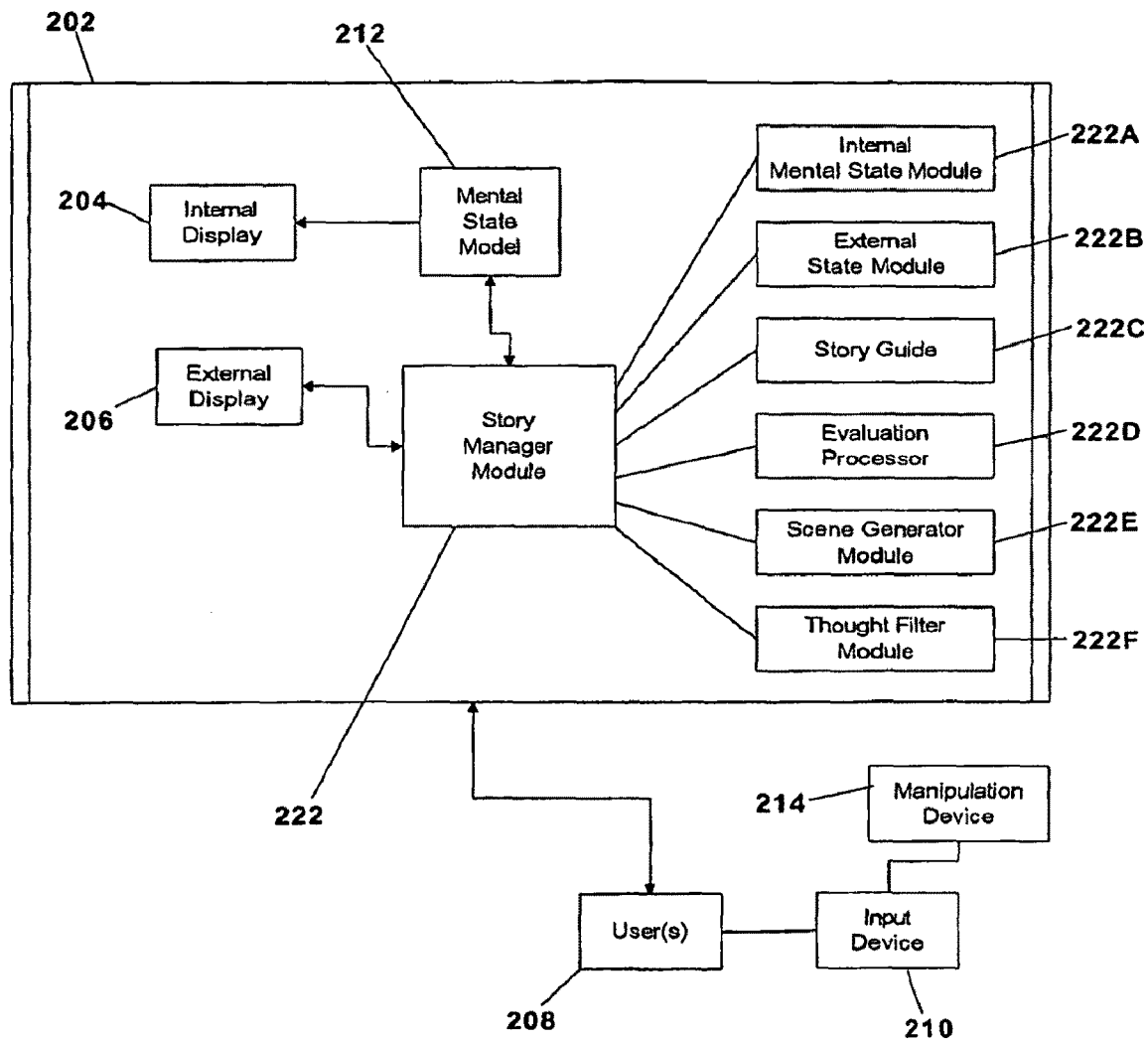
FIG. 2 includes a schematic block diagram illustrating an example of a system structured in accordance with various embodiments of the invention.
Figure 3:
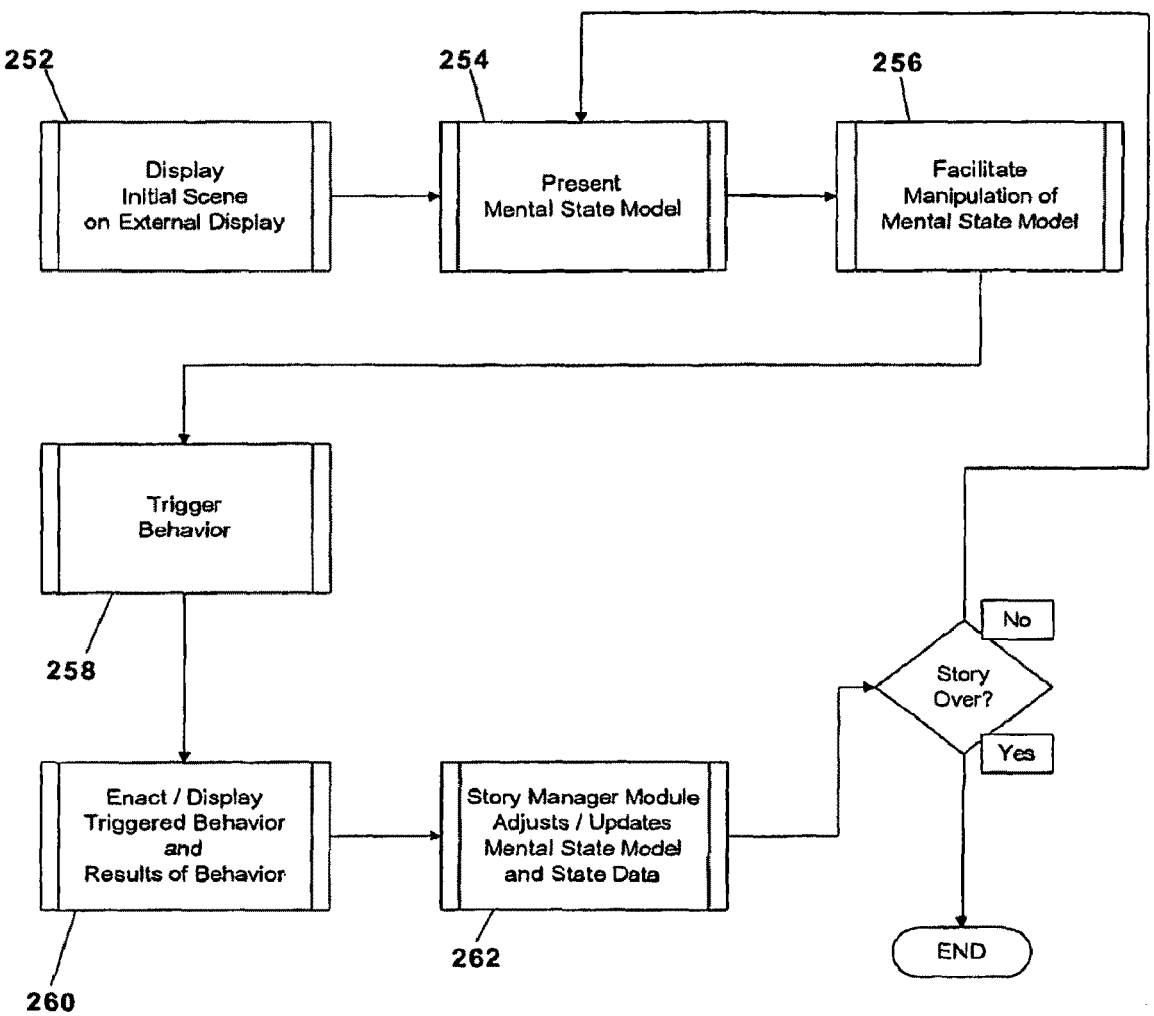
FIG. 3 includes a process flow diagram illustrating an example of a method provided in accordance with various embodiments of the invention.

With reference to FIGS. 2 through 4, an example embodiment of a system 202 configured to execute a method for simulating the effect of mental state on character behavior is schematically illustrated. The system 202 may be a computer system including one or more displays 204, 206 configured to receive data input from a user 208 (or an input device 210 employed by the user 208), and/or to display one or more scenes of an interactive story executed by the system 202. The first display 204 may be configured as an internal display that presents an interactive, simulated mental state model 212 associated with at least one character in the story. The second display 206 may be configured as an external display that shows characters behaving or performing actions in the interactive story environment. An initial scene of the story, for example, may be displayed on the external display at step 252. As shown in FIGS. 4A-4E, the displays 204, 206 can be presented to the user 208 alternately on a single screen (see FIG. 4A, e.g., the system 202 presents one display 204, 206 at a time, and changes to the other display 204, 206 as the interactive story progresses). In certain embodiments, the internal display 204 may be positioned within the external display 206 (as shown in FIG. 4B); conversely, the external display 206 may be positioned within the internal display 204 (as shown in FIG. 4C). Also, the displays 204, 206 may be shown simultaneously on a split screen (see FIG. 4D), or simultaneously on an input device 210 capable of utilizing two or more screens for the same application (see FIG. 4E). For example, the system 202 and the input device 210 can be configured for displaying the simulated mental state model 212 on the first screen display 204 of the input device 210, and the character behavior on the second screen display 206 of the device 210, wherein the first and second screen displays 204, 206 are separate but associated with the same input device 210.

In various embodiments, the user 208 may communicate with the system 202 through one or more different communication media using the input device 210. Examples of communication media include, without limitation, network connections (e.g., an intranet or Internet connection), cable connections, modems, wireline communication, wireless communication, and/or through satellite communication.

Figure 5:
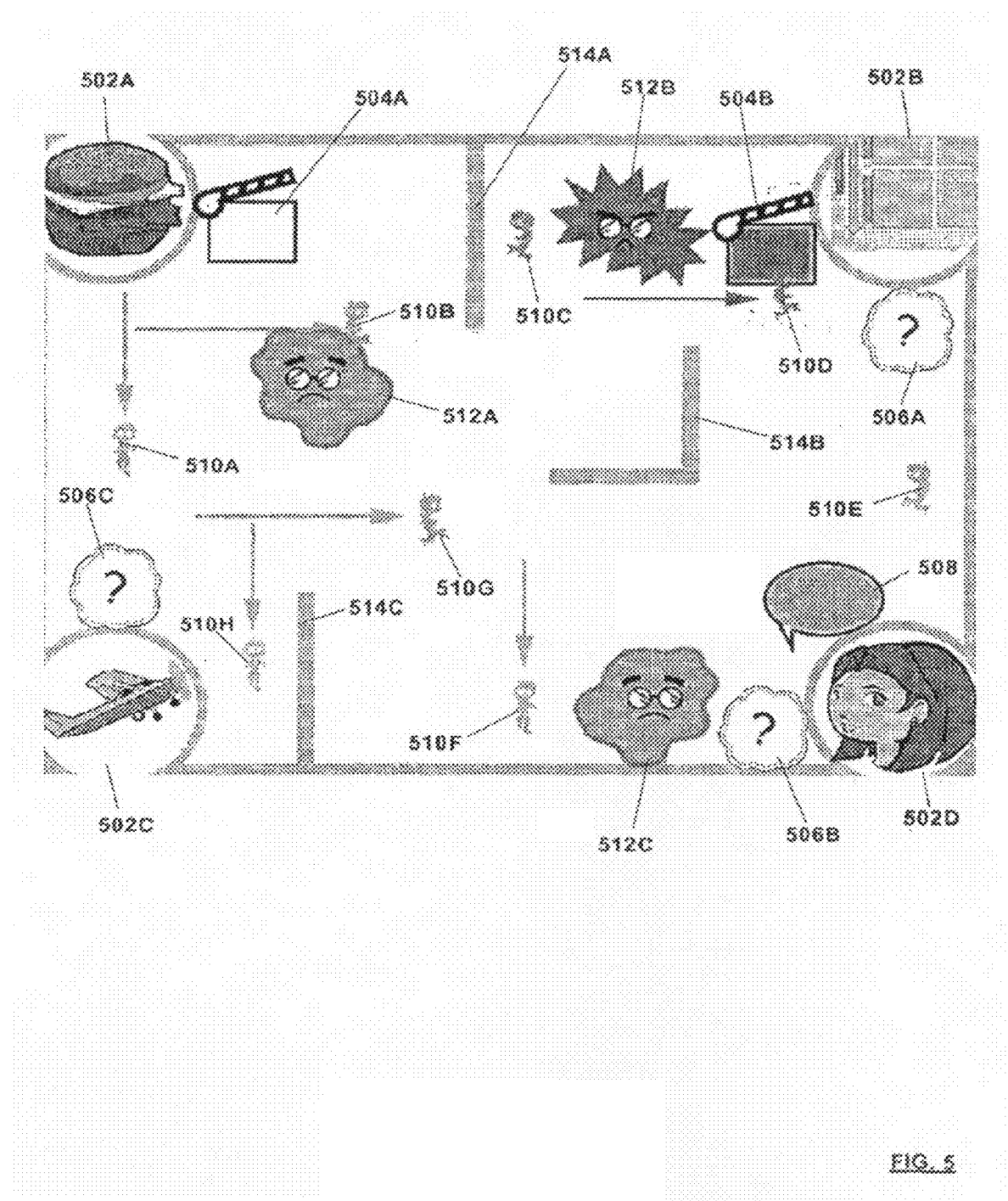
FIG. 5 illustrates a screen display example of a mental state model that may be employed by various embodiments of the invention.

In various embodiments, the simulated mental state model 212 may be presented at step 254 to function as an interactive visual tool that allows the user 208 to see, manipulate, or interact with one or more pre-behavior representations associated with the character in the story environment. A sample mental state model 212 is illustrated in FIG. 5, including a variety of potential subjects 502A-502D and various pre-behavior representations such as, for example, actions 504A, 504B, thoughts 506A-506C, and/or verbal expressions 508. The subjects 502A-502D include possible topics or matters the character might think about, talk about, or act upon, for example. The pre-behavior representations include thoughts, statements, or actions that the character could potentially take, and they may be connected to one or more of the subjects 502A-502D. In certain embodiments, the audio or visual attributes of a pre-behavior representation (e.g., coloring, size, shape, warning siren, etc.) can be indicative of the behavior type (e.g., a thought, verbal statement or expression, or action); the behavior emotional association (i.e., whether it is associated with sadness, happiness, anger, fear, etc.); the behavior strength or energy level (e.g., how likely it is this behavior will occur); and/or, story line functionality (e.g., what story sequence the behavior represents).

Referring again to FIG. 5, the frame of each pre-behavior representation or other element in the mental state model 212 can indicate its associated character behavior. For example, a "thought balloon" frame indicates a potential thought 506A-506C, a "speech balloon" frame indicates a potential statement 508, and a "movie clapboard" frame indicates a potential action 504A, 504B. In certain embodiments, the color of a pre-behavior representation indicates the emotion of the behavior associated with the pre-behavior representation. For example, the color blue may mean "sad"; the color yellow may mean "happy"; the color red may mean "angry"; the color green may mean "scared"; and, the color gray may mean "no emotion" or "indifference". In addition, frames of character pre-behavior representations may also feature an icon or other graphic to suggest more detail about their nature. It can be seen that a graphical or audio representation can be associated with at least one pre-behavior representation in the mental state model 212. Icons can be placed on actions, for example, to give the user 208 hints about their functionality. In certain embodiments, each of the pre-behavior representations may have an associated energy level which determines the impact of the pre-behavior representation if and when it is converted into a character behavior during manipulation of the mental state model 212 at step 256.

In operation of the system 202, one or more animated FIGS. 510A-510H representative of the mental energy of the character may be positioned for movement within the mental state model 212 and presented to the user 208 on the input device 210. One or more emotions may be associated with at least one of the animated FIGS. 510A-510H, with each emotion having an associated energy level. Examples of emotions include, without limitation, joy, anger, fear, sadness, indifference and many others. The animated FIGS. 510A-510H may be configured to move randomly on the internal display 204, and/or their movement may be promoted by permitting manipulation by the user 208 at step 256 with a manipulation device 214, such as by the user 208 touching the animated FIGS. 510A-510H on a screen of the input device 210 with a stylus or a mouse, for example. The animated FIGS. 510A-510H may be capable of absorption into at least one pre-behavior representation of the mental state model 212. In response to its absorption of an animated FIG. 510A-510H, an energy level of the pre-behavior representation may be adjusted according to an emotion associated with and/or an energy level of the absorbed animated FIG. 510A-510H. The rate and quantity with which the FIGS. 510A-510H appear in the mental state model 212 may be configured to correspond to the level of story intensity, as may be reported by a story manager module 222 (see below).

In their movement throughout the simulated mental model 212, each animated FIG. 510A-510H may adjust its associated emotion and/or energy level by interacting with one or more pools of emotion 512A-512C. In certain embodiments, each animated FIG. 510A-510H may start with a neutral emotion that can be colored accordingly by the pools of emotion 512A-512C. These pools 512A-512C represent the character's current emotional state as may be dictated by progression of the story. Each pool 512A-512C may be colored as a graphical indication of its associated emotion. The quantity of each type of pool of emotion 512A-512C can be a factor of the intensity of that emotion in the character's mental state at a given point in the story. For example, when the character is very happy, many yellow "happy" pools of emotion 512A-512C might form; or when the character is sad and afraid, blue and, green pools or emotion 512A-512C might form instead, for example. When the animated FIGS. 510A-510H initially appear in the mental state model 212, they may have neutral emotion, but when they move through a particular pool of emotion 512A-512C, they may adopt the emotion that the pool 512A-512C represents, and continue to carry that kind of emotional energy until they are absorbed into a pre-behavior representation, for example, or until they move through a different pool of emotion 512A-512C.

In addition, as shown in FIG. 5, one or more mental obstacles 514A-514C may be positioned within the simulated mental model 212 and configured for resisting movement of the animated FIGS. 510A-510H throughout the model 212. The obstacles 514A-514C may represent, for example, tension in the mental state of the character. For example, the mental model 212 can be configured such that the more tension that arises from a given story scene for the character, the more obstacles that will result in the updated mental state model 212, thereby decreasing the possibility of triggering certain character behaviors.

When an animated FIG. 510A-510H collides with a pre-behavior representation, it may be absorbed into the pre-behavior representation which may then grow in physical size and/or energy level by a predetermined number of units. In certain embodiments, the size and/or energy level of a pre-behavior representation determines its trigger point. When an emotionally charged animated FIG. 510A-510H collides with and is absorbed by a pre-behavior representation of the same matching emotion, for example, the pre-behavior representation may be structured to grow and/or adjust its energy level by a predetermined enhanced amount to reflect the defined parameter that matching emotional energy is comparatively more powerful than non-matching emotional energy. In certain embodiments, when an emotionally charged animated FIG. 510A-510H collides with a pre-behavior representation that is associated with a non-matching emotion, then the animated FIG. 510A-510H may be deflected or rejected, as if the pre-behavior representation were an obstacle to the animated FIG. 510A-510H. In this non-matching situation, the pre-behavior representation may experience little or no growth or adjustment of energy level.

It can be appreciated that the user 208 may interact with or manipulate the animated mental energy FIGS. 510A-510H by moving a stylus or mouse pointer over them, for example, to influence them to change direction, thus guiding them through or around pools of emotion 512A-512C, around the obstacles 514A-514C, and/or to (or away from) particular pre-behavior representations. Another method of interaction for the user 208 with the interactive story is through the pre-behavior representations themselves. In operation of the mental state model 212, the pre-behavior representation that has experienced the most growth or adjustment in energy level can be configured to indicate that it has achieved dominant status by blinking, for example, or by generating another visual and/or audio signal which can be displayed to the user 208. At that point, the user 208 can select the dominant pre-behavior representation, and its associated behavior (e.g., act, thought, or verbal expression) can be triggered at step 258. In certain embodiments, if a pre-behavior representation reaches a certain predetermined size or energy level (e.g., ten units of growth), then the mental state model 212 may automatically trigger the pre-behavior representation and its associated behavior.

It can be seen that embodiments of the invention permit a user 208 to trigger at step 258 at least one behavior associated with a pre-behavior representation based on manipulation of the simulated mental state model 212. Also, the system 202 may automatically trigger at least one behavior associated with a pre-behavior representation including at least one thought, action, or verbal expression after a predetermined period of time which can be allotted to the user to manipulate the mental state model 212. Manipulating the simulated mental state model 212 may also be accomplished by the system 202 automatically triggering at least one behavior associated with a pre-behavior representation once the selected pre-behavior representation achieves a predetermined size or adjustment in energy level, for example. At step 260, the triggered character behavior, and the results or consequences of the character behavior, may be enacted in the story.

In various embodiments, the system 202 may include a story manager module 222 configured to monitor and update the simulated mental state model 212, and/or to adjust other states of the story environment at step 262 based on character behaviors, for example, or other factors or events. The story manager module 222 may include one or more of the following components: an internal mental state module 222A that processes data representing the mental state of the character (e.g., intensity of particular emotions, personal goals, personal history, current subjects in the mental state of the character, etc.—an example of a table of internal mental state module 222A data is illustrated in FIG. 6); an external state module 222B that processes data representing the state of the story environment or game world (e.g., time of day, objects present, other characters present, etc.—an example of a table of external state module 222B data is illustrated in FIG. 7); a story guide 222C which comprises a script or set of rules that the story manager module 222 uses to determine what should happen next as the interactive story progresses, based on user 208 input and state data, for example; an evaluation processor 222D configured to apply the story guide 222C to the state data to progress the story; a scene generator module 222E designed to assemble the graphical, textual, and aural assets of the interactive story to present scenes of the interactive story on the external display 206 and/or to fill in details of a story scene based on the current data in the external state module 222B and/or in the internal mental state module 222A; a thought filter module 222F that uses state data and the story guide 222C to select a set of subjects and pre-behavior representations to be included within updated versions of the mental state model 212. In certain embodiments, the steps of facilitating manipulation of the mental state model 212 of the character and applying the manipulated mental state model 212 with the story manager module 222 may be executed sequentially as the story progresses. In other embodiments, the steps of facilitating manipulation of the simulated mental state model 212 and applying the manipulated mental state model 212 with the story manager module 222 may be executed in parallel and/or in real time. In various embodiments, the external state module 222B and the internal mental state module 222A may be configured to select pre-behavior representations for inclusion within the updated mental state model 212.

Figure 10:
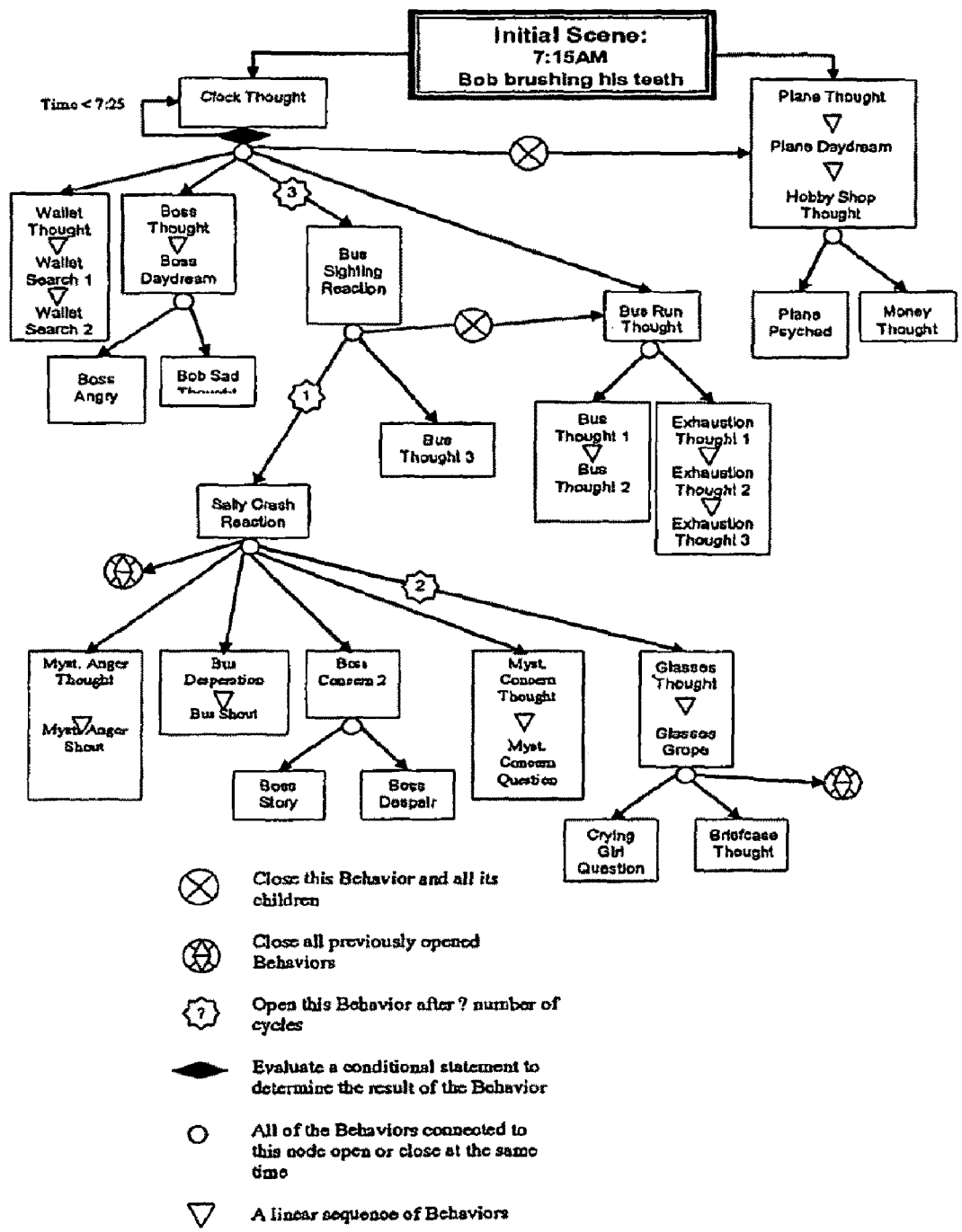
FIG. 10 includes a graphical depiction of a process flow that can be employed by a story guide in accordance with embodiments of the invention.

The table in FIG. 8 describes examples of the functionality of the story manager module 222 at each stage of progression of the interactive story. The story manager module 222 generates the fulfillment of character behaviors (e.g., actions, thoughts, or verbal expressions) and determines the results or repercussions of each such behavior. The story manager module 222 uses the story guide 222C to determine how the story should progress after each character behavior. In various embodiments, the story guide 222C may include an evaluation algorithm, a script listing specific behaviors and results of behaviors, or a reasonable combination thereof. An example excerpt of a script for a story guide 222C is shown in FIGS. 9A-9C. A graphical depiction of the process flow of the story guide 222C is shown in FIG. 10.

The evaluation processor 222D may be programmed with an algorithm for controlling progression of the story. This algorithm may take many specific forms as known to those skilled in the art, and in one general embodiment the algorithm may factor together the triggered character behavior, internal mental state module 222A data, external state module 222B data, and the story guide 222C to generate results for the story. These results may involve a scene or series of scenes to be shown on the external display 206, and/or state data changes to the internal mental state module 222A, and/or the external state module 222B. With reference to FIG. 11, an example of a table generated by the evaluation processor 222D for use by the system 202 is illustrated. As shown, when a character behavior occurs, that behavior's entries in the table can be evaluated in the order in which they occur. In certain embodiments, one entry in the table per character behavior is applied by the evaluation processor 222D to the progression of the story.

When a character behavior is triggered by selection of a pre-behavior representation, several events may occur: the character behavior may be visibly enacted on the external display 206, advancing the interactive storyline; the reaction to or result of the character behavior, if any, may take place on the external display 206; and/or, the story manager 222 can update state data employed by the system 202. If the story is over as a result of the character behavior, then the loop of story progression may terminate. If the story progression continues, then the simulated mental state model 212 of the character can be altered or updated based on the character behavior and the response to or results of the character behavior at step 262. For example, updates to the mental state model 212 may include altering one or more pools of emotion 512A-512C contained in the mental state model 212. The subjects 502A-502D and pre-behavior representations available in the mental state model 212 and/or the rate of production of animated FIGS. 510A-510H, for example, may also be updated to reflect recent story events. The system 202 then proceeds again to step 254, as described above, to facilitate manipulation of the revised or updated mental state model 212. It can be seen, therefore, that the story manager module 222 of the system 202 may update the simulated mental state model 212 in association with the character behavior and/or as a consequence of character behavior that occurs in the interactive story.

It can be seen that the invention provides method embodiments for simulating the effect of mental state on character behavior. In various embodiments, the method may include displaying an initial scene of the interactive story on the internal display 204; and, establishing an initial simulated mental state model 212 of a character in the interactive story based on the initial scene, wherein the simulated mental state model 212 comprises at least one pre-behavior representation including at least one of a thought 506A-506C, verbal expression 508, or action 504A, 504B. The method may further include facilitating manipulation of the initial simulated mental state model 212, wherein the user 208 interacts with the mental state model 212 to attempt to move the character toward, or away from, certain potential subjects 502A-502D, thoughts 506A-506C, statements 508, actions 504A, 504B, or pools of emotion 512A-512C. Upon triggering a pre-behavior representation in the initial simulated mental state model 212, the user 208 can trigger a character behavior which can be an associated thought 506A-506C, verbal expression 508, and/or action 504A, 504B. The system 202 can apply the now manipulated mental state model 212, including the triggered behavior associated with the pre-behavior representation, to generate at least one behavior of the character in the interactive story. The system 202 may then display the character behavior and results of the character behavior, if any, on the external display 206. The method may also include adjusting the initial simulated mental state model 212 in response to the character behavior and the results of the character behavior. An updated or revised mental state model 212 may then be generated and displayed to the user 208 by the system 202.

Figure 13:
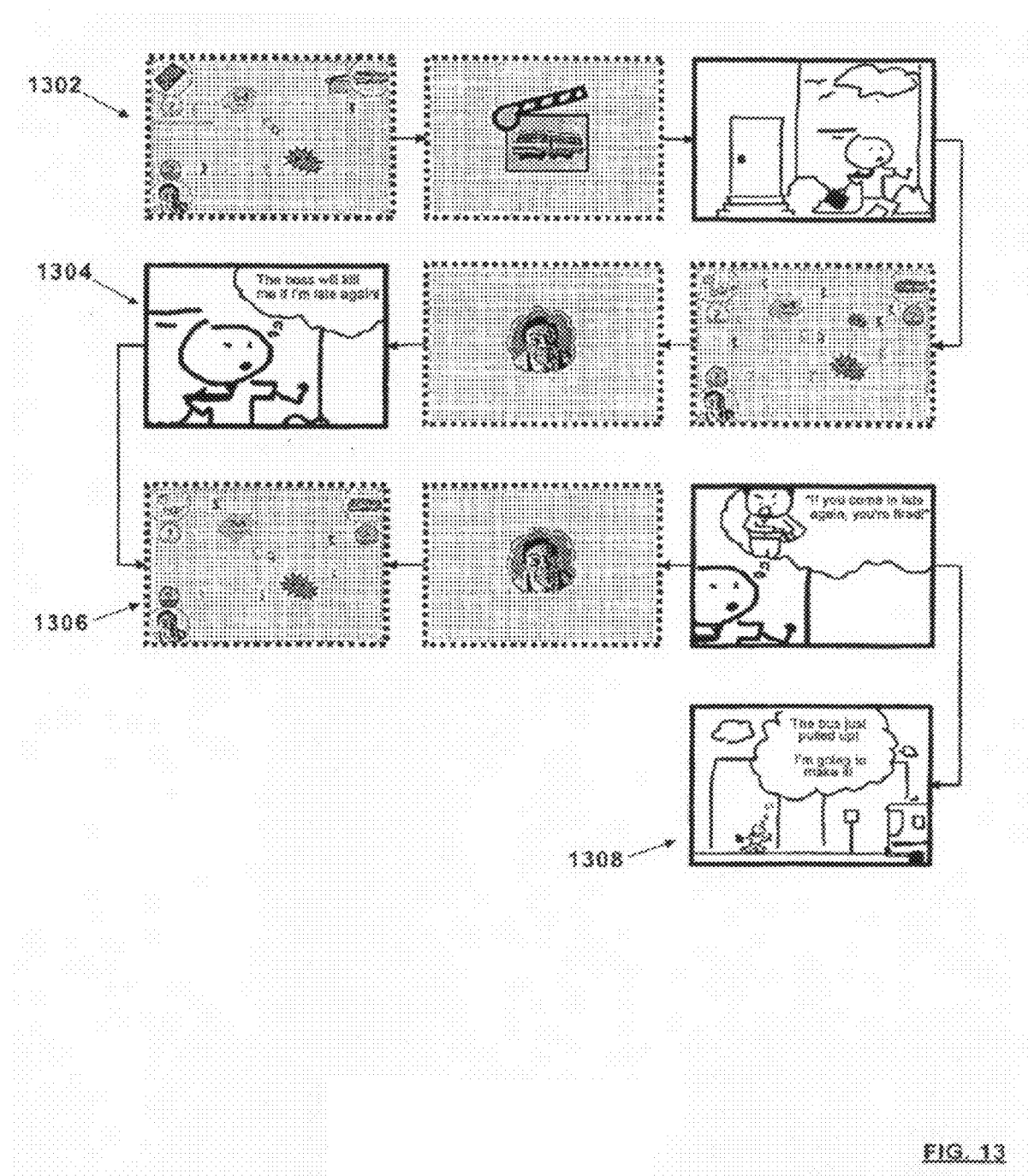
FIG. 13 includes a visual process flow of an exemplary sequence of steps performed by various system embodiments of the invention.
Figure 17:
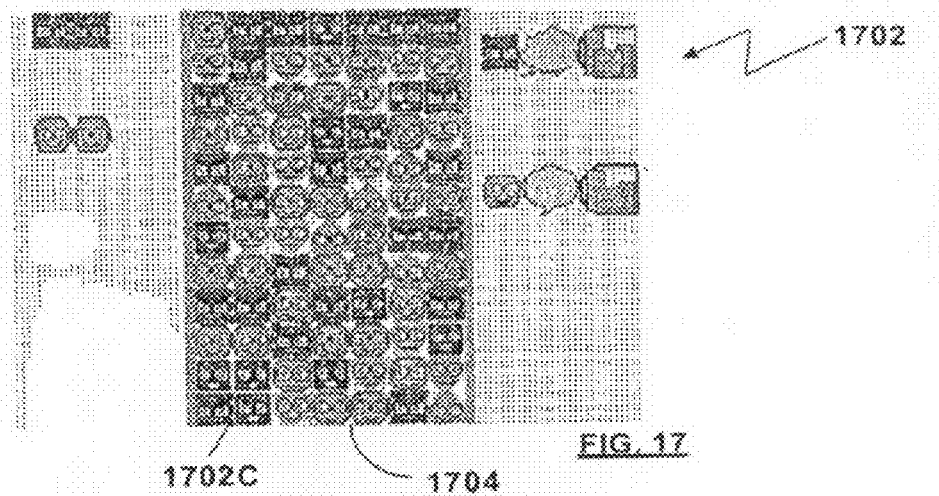

With reference to FIGS. 12 and 13, several examples of story progression sequence techniques are illustrated based generally on the story guide 222C script of FIGS. 9A-9C. For example, in a first sequence 1302, the user 208 triggers the "BUS-RUN" action, which causes the character to run to the bus stop. In a second sequence 1304, the user 208 triggers the "BOSS-THOUGHT 1" thought which causes the character to think about a supervisor or "boss" working for the employer of the character in the story. In a third sequence, the user 208 triggers the "BOSS-DAYDREAM" thought character behavior which causes the character to flashback to a prior time when the boss yelled at the character. At this point in the progression, the thought character act "BUS-SIGHTING-REACTION" 1308 can be automatically generated as a result of the bus appearing in the external display 206.

Referring again to FIGS. 9A-9C, the format of the story guide 222C script can take many forms. The example shown in FIGS. 9A-9C uses a hierarchal list format, for example, to describe how the story may progress. This list comprises character behaviors and their results. With reference to section 902 of FIG. 9A, for example, "CLOCK-THOUGHT" is the title of the character behavior. The results of this behavior are determined by a conditional. In this example, the first conditional is an external state piece of data: "Condition: Time<7:25 a.m." If this condition is true, then the scene described in this condition branch will occur. If it is not true, the next conditional is tested, which is an "Else" statement that requires, if all previous conditionals were false, execution of the next series of commands positioned in the hierarchy. The condition branch shows the "Scene" listed and causes a state change to the internal mental state data and the external state data. In this example, the state changes include an increase in the "Fear" attribute of the internal mental state data. Finally, the condition branch causes new character pre-behavior representations to become available and others to close. In this example, the condition opens three new pre-behavior representations and closes all other previously opened pre-behavior representations.

In various embodiments, pre-behavior representations may have certain attributes that determine how they are represented in the mental state model 212. For example, "BOSS-THOUGHT(s:Boss, t:thought, e:fear)" has a subject of "Boss", and this determines the parent relationship of this child pre-behavior representation in the mental model 212; and that it is a type of "thought" which determines the icon shape of the pre-behavior representation in the mental state model 212; and that it has an emotional association to "fear" which determines what kinds of animated FIGS. 510A-510H will affect the size or energy level of this pre-behavior representation. In certain embodiments, a pre-behavior representation may have a "delay" attribute as well (e.g., "d:3"), indicating that the behavior only becomes available after a certain number of story sequences. In certain embodiments, a "Trigger" may be included to cause a character behavior to occur after a predetermined delay. For example, with reference to section 904 of FIG. 9B, the character behavior "BUS-RUN" automatically triggers the "BUS-SIGHTING-REACTION" character behavior after three cycles of game play.

With general reference to FIGS. 14 through 24, other examples of the method and system embodiments described herein are illustrated. An interactive story may be executed by the system 202 with an opening scene as illustrated in the sample screen display 1402 of FIG. 14. In this example, a character 1404 is at work when he remembers that he needs to finish a report which is overdue. The visual representation shown in FIG. 14 may be presented to a user on the external display 206, for example.

With regard to FIG. 15, a screen display 1502 visually presents, such as on the internal display 204 of the system 202, the mental state model 212 which is embodied as a three-part screen display 1502 in this example. The mental state model 212 represents the current mental state of the character 1402. As shown, the character 1402 currently has +2 Joy (represented by two smiling icons 1504, 1506 on a left portion 1502A of the screen display 1502); +2 Anger (represented by two angry icons 1508, 1510 on the left portion 1502A); and two character pre-behavior representations shown as thought bubbles 1512, 1514 attached to a joyful face 1516 and an angry face 1518, respectively, on a right portion 1502B of the screen display 1502. A middle portion 1502C of the screen display 1502 initially is empty.

With reference to FIG. 16, various emotion icons (referred to collectively as 1604) drop down into and begin to fill the middle portion 1602C of the screen display 1602. As shown in the screen display 1702 of FIG. 17, the middle portion 1702C is filled to capacity with emotion icons 1704 (collectively).

Figure 18:
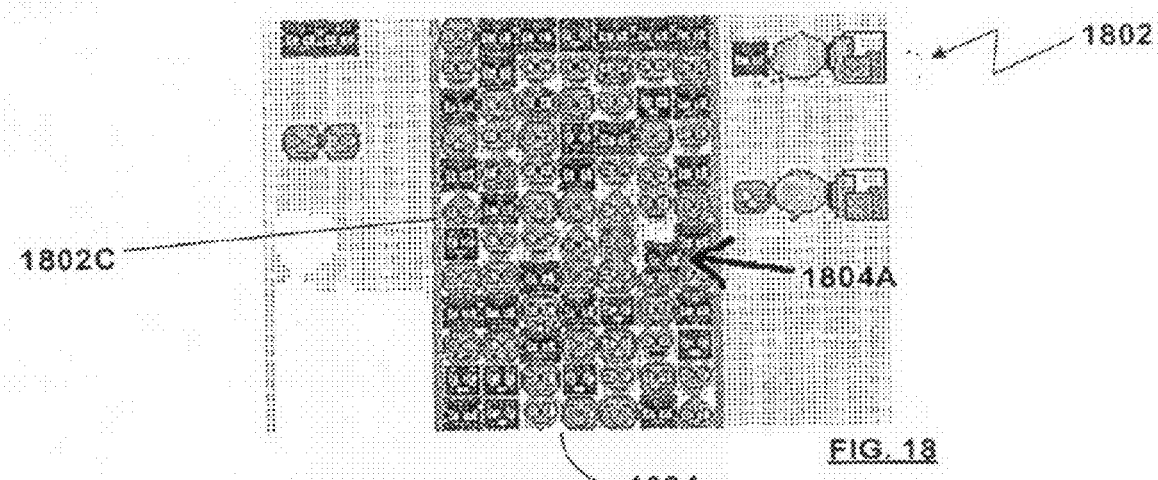
Figure 19:
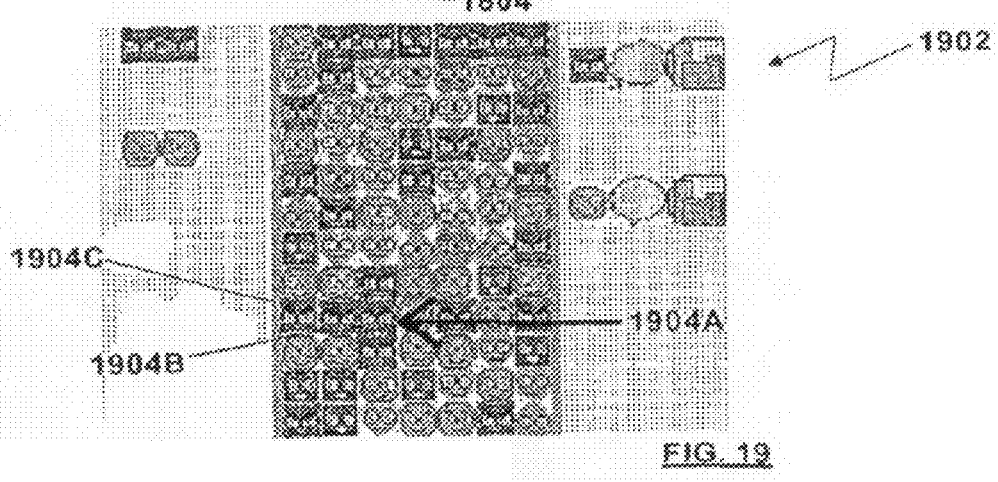

With reference to the screen display 1802 of FIG. 18, a user may manipulate the emotion icons 1804. For example, the user may grab an angry icon 1804A, such as with a mouse or stylus, and move or reposition the icon 1804A to another location within the middle portion 1802C. As illustrated in the screen display 1902 of FIG. 19, in this example the user elects to move the first angry icon 1904A next to other angry icons 1904B, 1904C, which are of the same kind of emotion as the first angry icon 1904A. Collectively, the icons 1904A-1904C form a sequence which, once put together in this manner, begin to visually shake or blink on the screen display 1902, or otherwise exhibit a visual cue to the user that the sequence has been formed.

Figure 20:
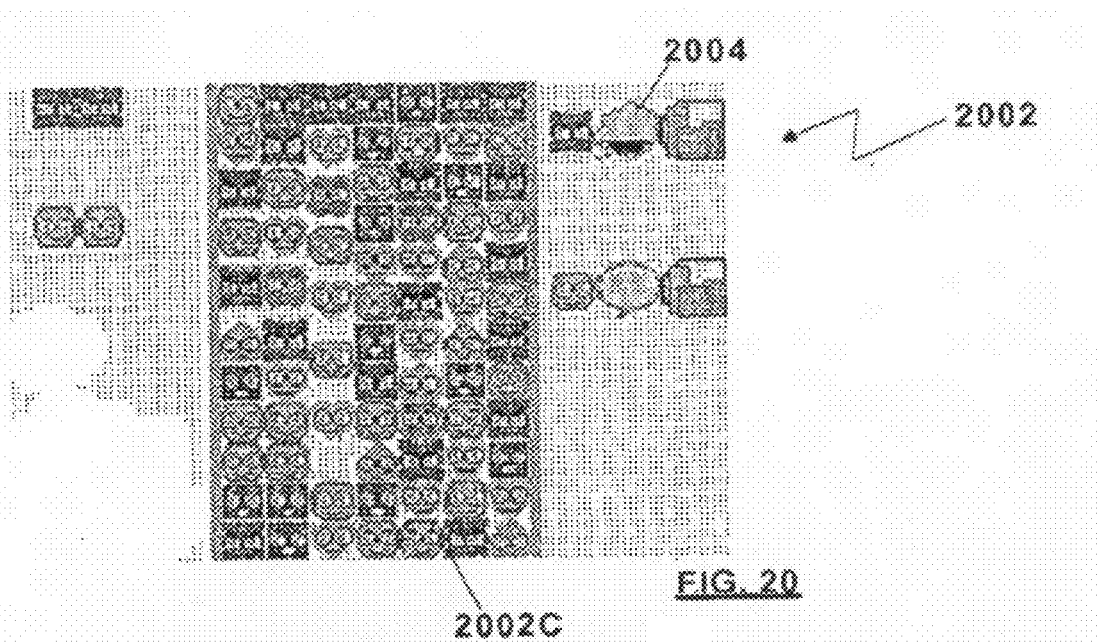

As shown in FIG. 20, after a predetermined period of time (e.g., a few seconds), the sequence of icons 1904A-1904C vanishes from the screen display 2002. As a consequence of the formation of the sequence, an angry cloud pre-behavior representation 2004 has filled partially in response to the simulated negative energy generated from the vanishing sequence of icons 1904A-1904C. It can be seen that various new emotion icons fall from the top of the middle portion 2002C to fill the space left behind upon removal of the sequence of icons 1904A-1904C.

Figure 21:
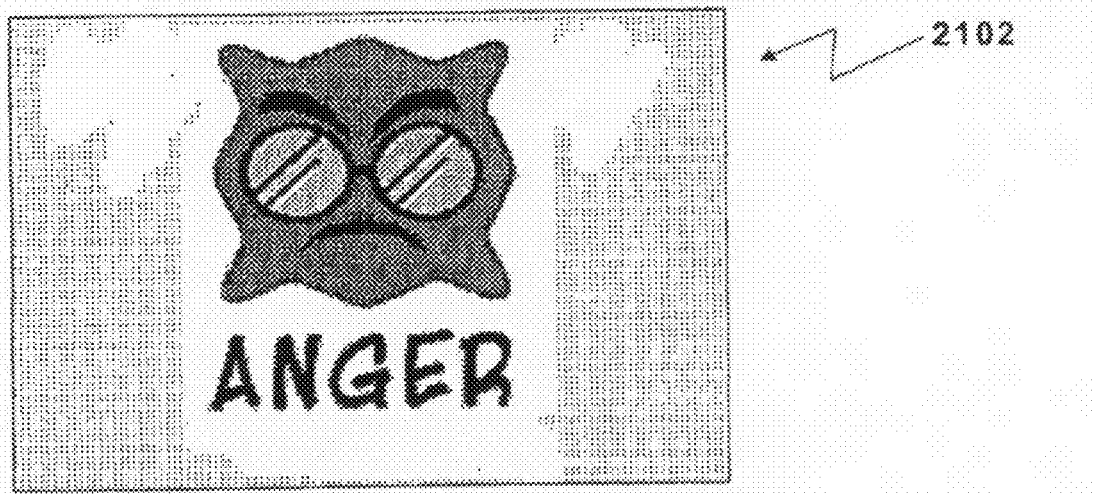
FIGS. 21 and 22 illustrate sample visual depictions that may be displayed to a user on an external display in association with various embodiments of the invention; and, FIGS. 23 and 24 illustrate examples of screen displays or user interfaces that may be configured to facilitate manipulation of a mental state model in association with various embodiments of the invention.
Figure 22:
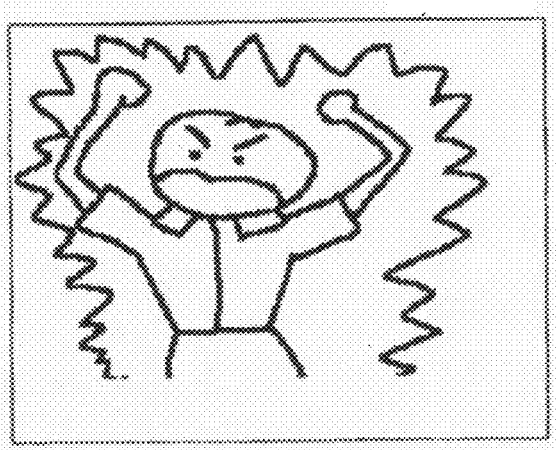

As shown in the screen display 2102 of FIG. 21, a visual depiction can be displayed to notify the user that an angry character pre-behavior representation has been triggered based on manipulation of the mental state model 212. The system 202 may then switch to the external display 206 to display the triggered character behavior as part of the interactive story (see FIG. 22).

Figure 23:
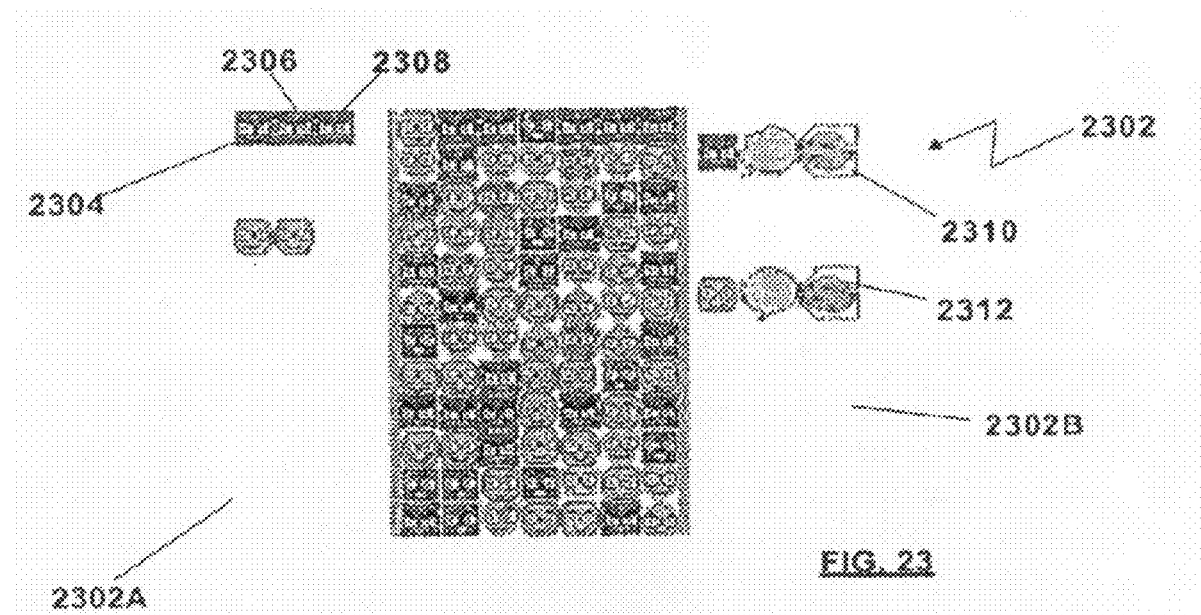
Figure 24:
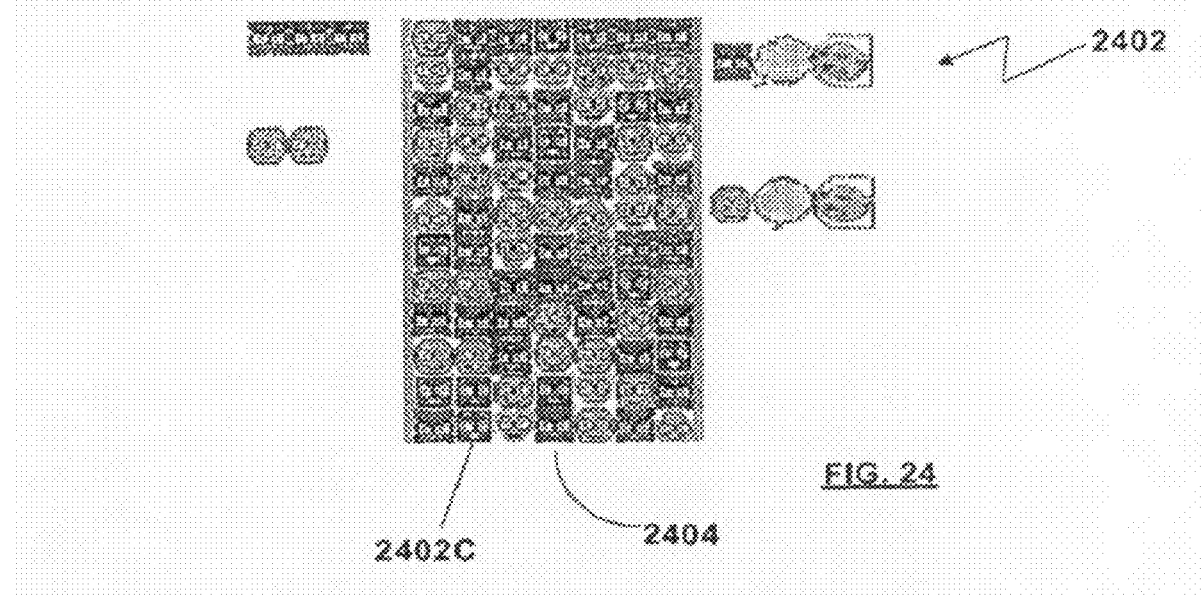

With regard to the screen display 2302 of FIG. 23, after the external display 206 scene has finished playing, the system 202 may shift the user back to the internal display 204 to permit further manipulation of the mental state model 212. As shown, the character possesses +3 Anger (as represented by the angry icons 2304, 2306, 2308 on the left portion 2302A of the screen display 2302). In addition, two new potential pre-behavior representations 2310, 2312 are presented on the right portion 2302B of the screen display 2302. As shown in FIG. 24, before play resumes, a number of the emotion icons 2404 (collectively) in the middle portion 2402C of the screen display 2402 may be transformed into angry emotion icons, representing the shift for the character in the story from +2 Anger to +3 Anger.

As used herein, a "computer" or "computer system" may be, for example and without limitation, either alone or in combination, a personal computer (PC), server-based computer, main frame, server, web server, microcomputer, minicomputer, laptop, personal data assistant (PDA), cellular phone, pager, processor, including wireless and/or wireline varieties thereof, and/or any other computerized device capable of configuration for receiving, storing and/or processing data for standalone application and/or over a networked medium or media.

An "input device" may include, without limitation, any device or computer system capable of receiving and processing electronic data or information. Examples of "input devices" include, without limitation, personal computers, personal data assistant (PDAs), mobile phones, wireless phones, smart phones, trade-designated "Sony" or "Nintendo" entertainment devices, notebook computers enabled for wireless communication, video game consoles or entertainment stations, non-computer based game-playing devices, portable electronic devices, portable electronic entertainment devices, and/or various other kinds of suitable input devices.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, Visual Basic, and/or a variety of other kinds of programming languages that may be applied to create and compile computer-executable instructions in accordance with embodiments of the invention.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. The diagrams and configuration of screen displays depicted herein are provided by way of example. There may be variations to the diagrams, screen displays, or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims. For example, embodiments of the system 202 may employed as an entertainment device, as an educational tool, and/or as an experimental tool for use in psychological evaluations.

What is claimed is:

1. A computer-assisted method for simulating the effect of mental state on character behavior in an interactive story environment, the method comprising:
   displaying, on a computer system including at least one processor, an initial scene of the interactive story;
   establishing, with the computer system, a simulated mental state model of a character in the interactive story based on the initial scene, the mental state model comprising at least one pre-behavior representation associated with at least one behavior including at least one of a thought, verbal expression, or action;
   facilitating, with the computer system, manipulation of the initial simulated mental state;
   triggering, with the computer system, a behavior associated with one of the pre-behavior representations;
   applying, with the computer system, the manipulated mental state model including the triggered behavior to generate at least one behavior of the character in the interactive story;
   displaying, with the computer system, the character behavior and results of the character behavior; and,
   adjusting, with the computer system, the mental state model in response to the character behavior and the results of the character behavior.

2. The method of claim 1, further comprising updating the simulated mental state model of the character in association with the character behavior.

3. The method of claim 1, further comprising updating the simulated mental state model of the character in association with a consequence of the character behavior in the interactive story.

4. The method of claim 1, further comprising updating the mental state model of the character with a story manager configured for adjusting the mental state model in response to at least one of the character behavior or a consequence of the character behavior.

5. The method of claim 1, wherein the mental state model further comprises at least one animated figure representative of mental energy of the character.

6. The method of claim 5, further comprising permitting manipulation of at least one animated figure with a manipulation device.

7. The method of claim 5, further comprising associating an emotion with at least one animated figure, the emotion having an associated energy level.

8. The method of claim 7, further comprising at least one animated figure being capable of absorption into at least one pre-behavior representation.

9. The method of claim 8, further comprising adjusting an energy level of at least one pre-behavior representation in response to absorption of at least one animated figure into the pre-behavior representation.

10. The method of claim 5, further comprising adjusting an emotional energy level of the animated figure in response to interaction of the animated figure with a pool of emotion.

11. The method of claim 1, wherein the mental state model further comprises at least one animated figure and at least one mental obstacle configured for resisting movement of the animated figure.

12. The method of claim 1, further comprising permitting a user to trigger at least one behavior associated with the pre-behavior representation.

13. The method of claim 1, further comprising automatically triggering at least one behavior associated with the pre-behavior representation after a predetermined period of time.

14. The method of claim 1, further comprising automatically triggering at least one behavior associated with the pre-behavior representation once the pre-behavior representation achieves a predetermined size or energy level.

15. The method of claim 1, further comprising displaying the mental state model on an internal display of an input device and the character behavior on an external display of the input device.

16. The method of claim 1, further comprising associating a graphical or audio representation with at least one pre-behavior representation.

17. A computer system programmed for simulating the effect of mental state on character behavior in an interactive story environment, the system comprising:

a computer system comprising at least one processor; and,
wherein the computer system is programmed for:
  displaying an initial scene of the interactive story;
  establishing a simulated mental state model of a character in the interactive story based on the initial scene, the mental state model comprising at least one pre-behavior representation associated with at least one behavior including at least one of a thought, verbal expression, or action;
  facilitating manipulation of the initial simulated mental state;
  triggering a behavior associated with one of the pre-behavior representations;
  applying the manipulated mental state model including the triggered behavior to generate at least one behavior of the character in the interactive story;
  displaying the character behavior and results of the character behavior; and,
  adjusting the mental state model in response to the character behavior and the results of the character behavior.

* * * * *